US012679778B2

(12) United States Patent  (10) Patent No.:  US 12,679,778 B2
Ebigase et al.  (45) Date of Patent:  Jul. 14, 2026

(54) BONDED SUBSTRATE

(71) Applicant: NGK INSULATORS, LTD., Nagoya (JP)

(72) Inventors: Takashi Ebigase, Nagoya (JP); Izumi Masuda, Kitanagoya (JP)

(73) Assignee: NGK INSULATORS, LTD., Nagoya (JP)

( * ) Notice: Subject to any disclaimer, the term of this patent is extended or adjusted under 35 U.S.C. 154(b) by 493 days.

(21) Appl. No.: 17/460,694

(22) Filed: Aug. 30, 2021

(65) Prior Publication Data

US 2021/0387923 A1     Dec. 16, 2021

Related U.S. Application Data

(63) Continuation of application No. PCT/JP2019/010545, filed on Mar. 14, 2019.

(51) Int. Cl.
*C04B 37/02*     (2006.01)
*B23K 1/19*     (2006.01)
(Continued)

(52) U.S. Cl.
CPC .............. *C04B 37/026* (2013.01); *B23K 1/19* (2013.01); *B23K 1/20* (2013.01); *B23K 35/007* (2013.01);
(Continued)

(58) Field of Classification Search
CPC ....... B32B 9/005; B32B 9/041; C04B 37/026; C04B 2237/368; C04B 35/584
See application file for complete search history.

(56) References Cited

U.S. PATENT DOCUMENTS 8,785,785 B2     7/2014  Kato
2002/0060091 A1*  5/2002  Naba ..................... H05K 3/381
174/250
(Continued)

FOREIGN PATENT DOCUMENTS

EP     3 321 957 A1     5/2018
JP     10-190176 A     7/1998
(Continued)

OTHER PUBLICATIONS

Machine translation of JP2005-268821A, published Sep. 29, 2005, Powered by EPO and Google. (Year: 2005).*
(Continued)

*Primary Examiner* — Monique R Jackson
(74) *Attorney, Agent, or Firm* — MATTINGLY & MALUR, PC

(57)     ABSTRACT

Electrical insulating properties between adjacent copper plates are improved while a defect of a bonded substrate which is caused by concentration of stress to end portions of the copper plates is prevented. A bonded substrate includes a silicon nitride ceramic substrate, a copper plate, and a bonding layer. The copper plate and the bonding layer are disposed on the silicon nitride ceramic substrate. The bonding layer bonds the copper plate to the silicon nitride ceramic substrate. The bonding layer includes: an interplate portion between the silicon nitride ceramic substrate and the copper plate; and a protruding portion protruding from between the silicon nitride ceramic substrate and the copper plate. Exposure of the silicon nitride ceramic substrate is prevented at a position where the protruding portion is disposed.

2 Claims, 11 Drawing Sheets

(51) Int. Cl.

| | |
|---|---|
| *B23K 1/20* | (2006.01) |
| *B23K 35/00* | (2006.01) |
| *B23K 35/02* | (2006.01) |
| *B32B 9/00* | (2006.01) |
| *B32B 9/04* | (2006.01) |
| *B23K 101/36* | (2006.01) |
| *B23K 103/00* | (2006.01) |
| *B23K 103/12* | (2006.01) |
| *B23K 103/18* | (2006.01) |
| *C04B 35/584* | (2006.01) |
| *C22C 5/08* | (2006.01) |

(52) U.S. Cl.
CPC .......... *B23K 35/0233* (2013.01); *B32B 9/005* (2013.01); *B32B 9/041* (2013.01); *B23K 2101/36* (2018.08); *B23K 2103/12* (2018.08); *B23K 2103/18* (2018.08); *B23K 2103/52* (2018.08); *C04B 35/584* (2013.01); *C04B 2237/368* (2013.01); *C04B 2237/407* (2013.01); *C04B 2237/52* (2013.01); *C04B 2237/59* (2013.01); *C22C 5/08* (2013.01)

(56) References Cited

U.S. PATENT DOCUMENTS

| | | | |
|---|---|---|---|
| 2014/0291699 | A1 | 10/2014 | Yano et al. |
| 2017/0323842 | A1 | 11/2017 | Tani et al. |
| 2018/0005918 | A1 | 1/2018 | Naba et al. |
| 2018/0190568 | A1 | 7/2018 | Naba et al. |
| 2019/0189548 | A1 | 6/2019 | Ohashi et al. |
| 2022/0225498 | A1* | 7/2022 | Yuasa ...................... H05K 1/09 |

FOREIGN PATENT DOCUMENTS

| | | | |
|---|---|---|---|
| JP | 2005268821 A * | 9/2005 | |
| JP | 2016-74565 A | 5/2016 | |
| JP | 2017035805 A | 2/2017 | |
| JP | 6158144 B2 | 7/2017 | |
| JP | 2018-506496 A | 3/2018 | |
| JP | 2018-107126 A | 7/2018 | |
| WO | 2017/006661 A1 | 1/2017 | |
| WO | 2017/200004 A1 | 11/2017 | |

OTHER PUBLICATIONS

Japanese Office Action received in corresponding Japanese Application No. 2021-505452 dated Jul. 5, 2022.

Japanese Opposition Request received in corresponding Japanese Patent No. 7197677 dated Jul. 28, 2023.

Takashio, H., "Bonding Mechanism Between Ceramics and Metal", Journal of Japan Institute of Metals and Materials, Dec. 20, 1985, pp. 113-120, vol. 24, No. 2.

International Preliminary Report on Patentability received in corresponding International Application No. PCT/JP2019/010545 dated Sep. 23, 2021.

Extended European Search Report received in corresponding European Application No. 19919323.6 dated Oct. 12, 2022.

International Search Report of PCT/JP2019/010545 dated May 7, 2019.

* cited by examiner

F I G. 1

F I G.  2
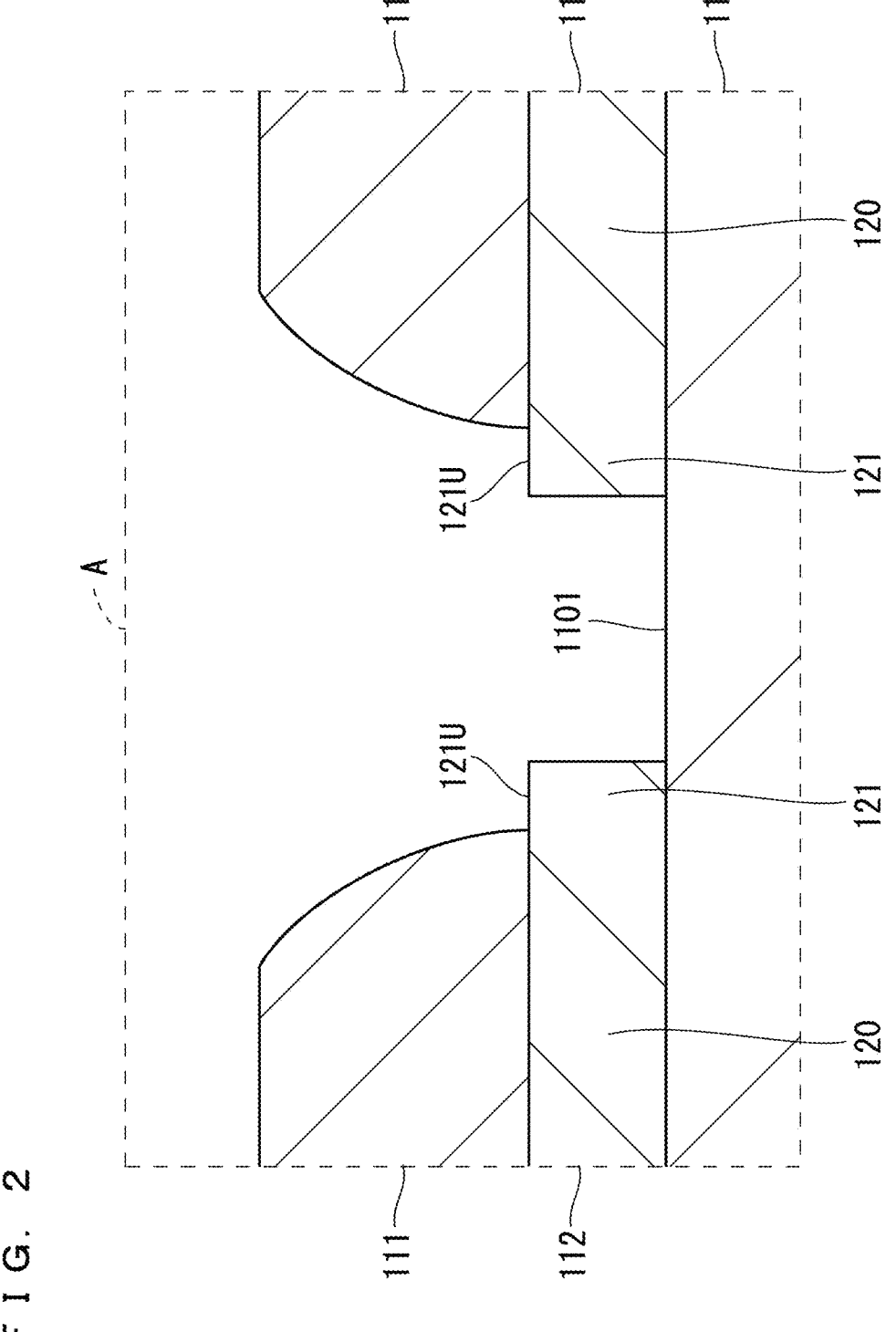

F I G. 3
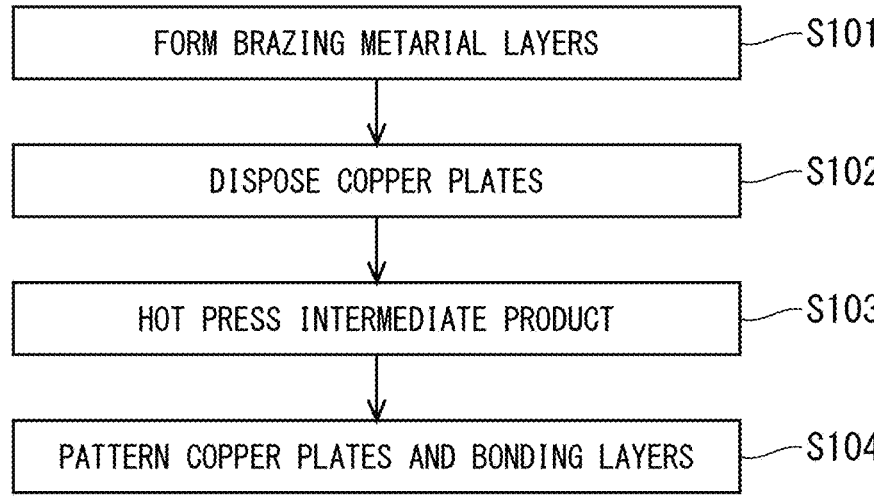

F I G. 4
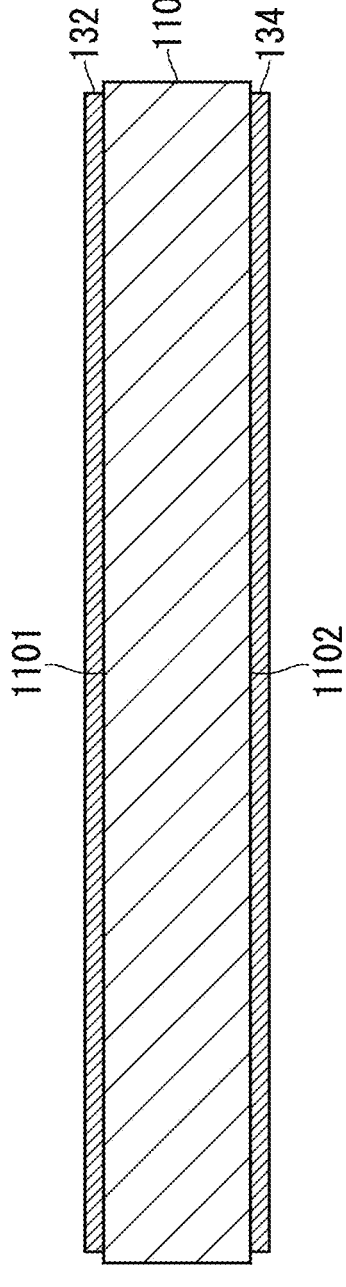

F I G. 5
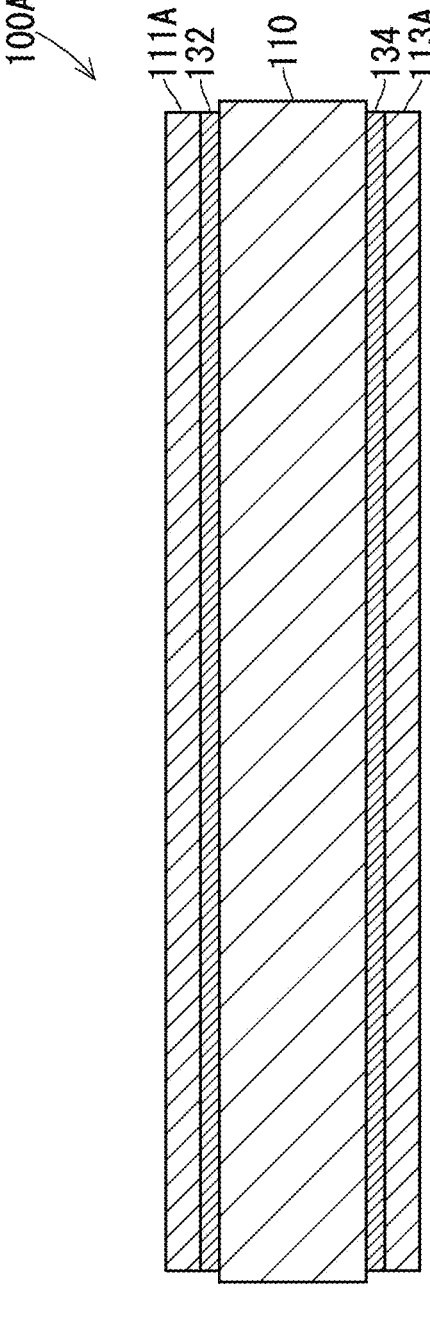
100A
111A
132
110
134
113A

100B 111A
112B
110
114B
113A

F I G.  7
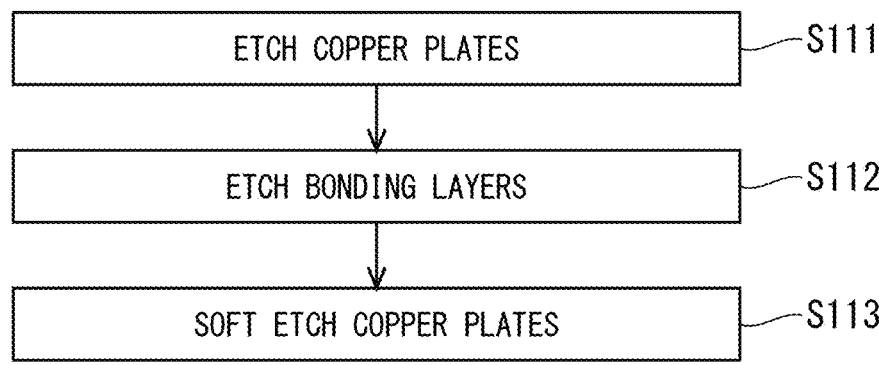

F I G. 8
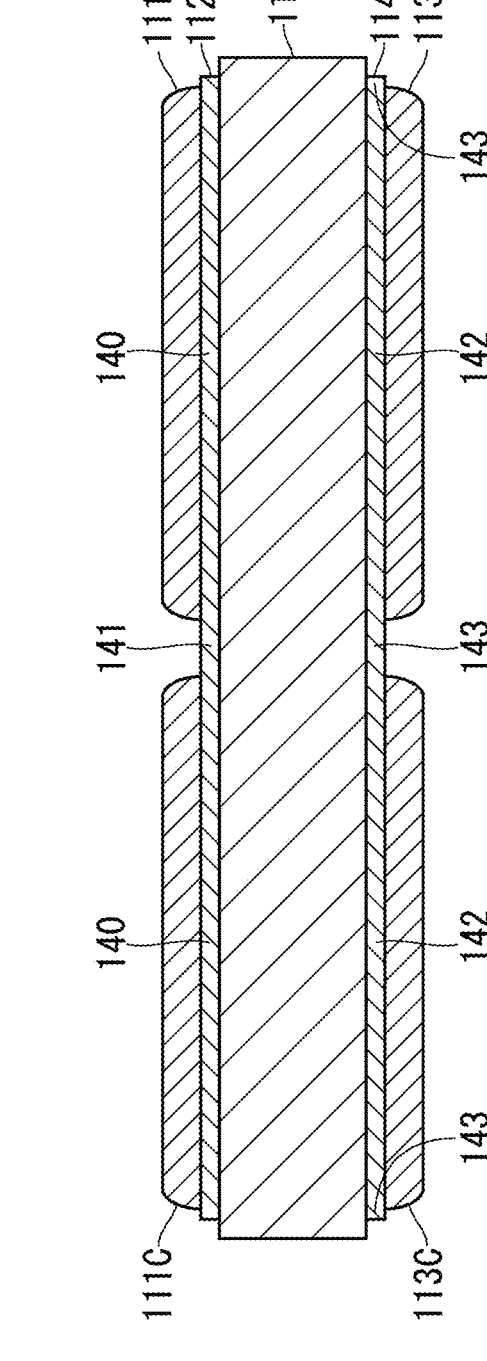

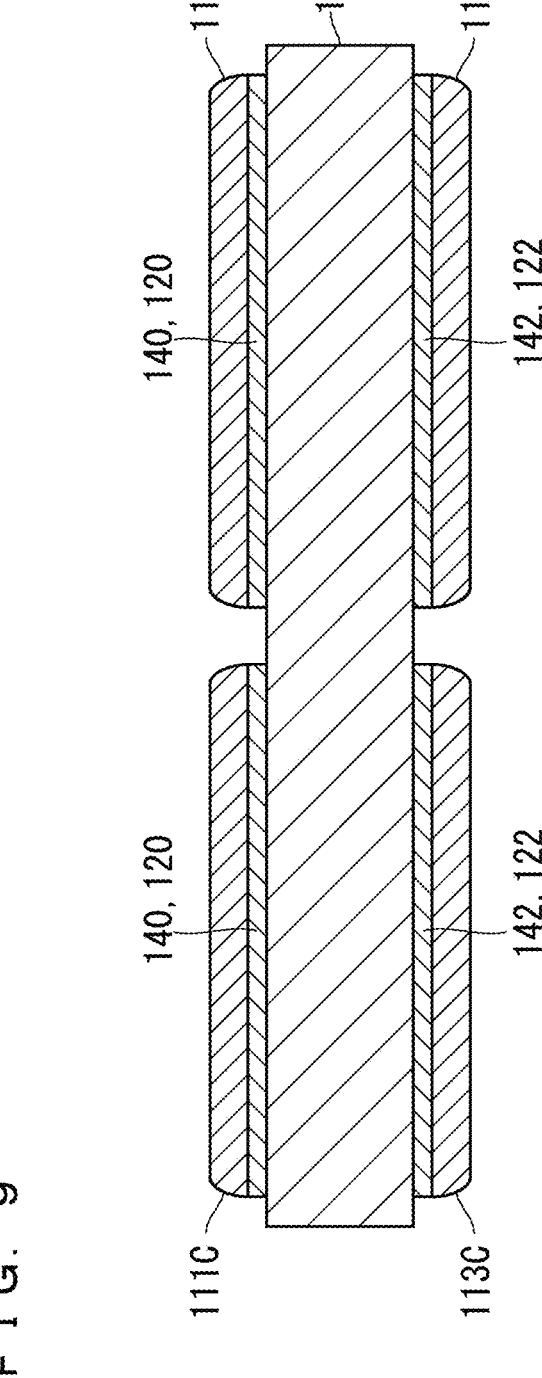
F I G.  9

F I G. 1 0
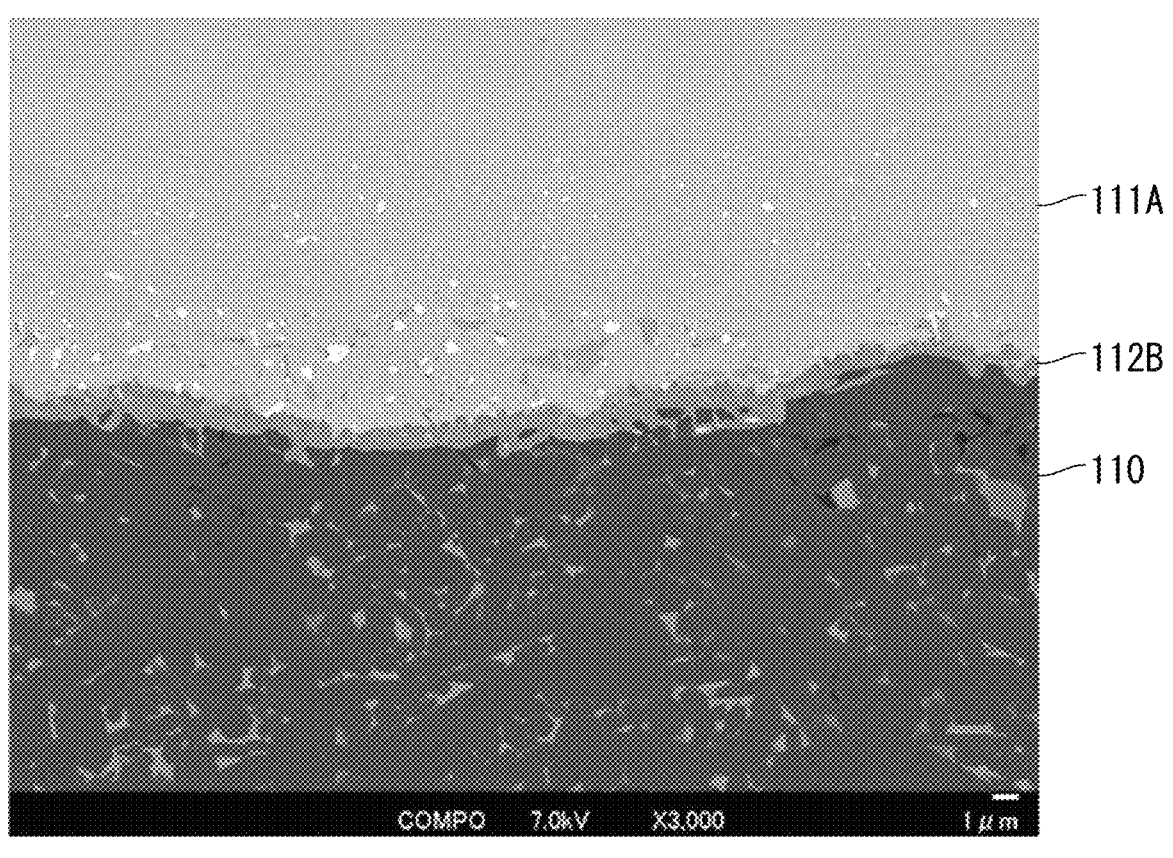

F I G.   1 1
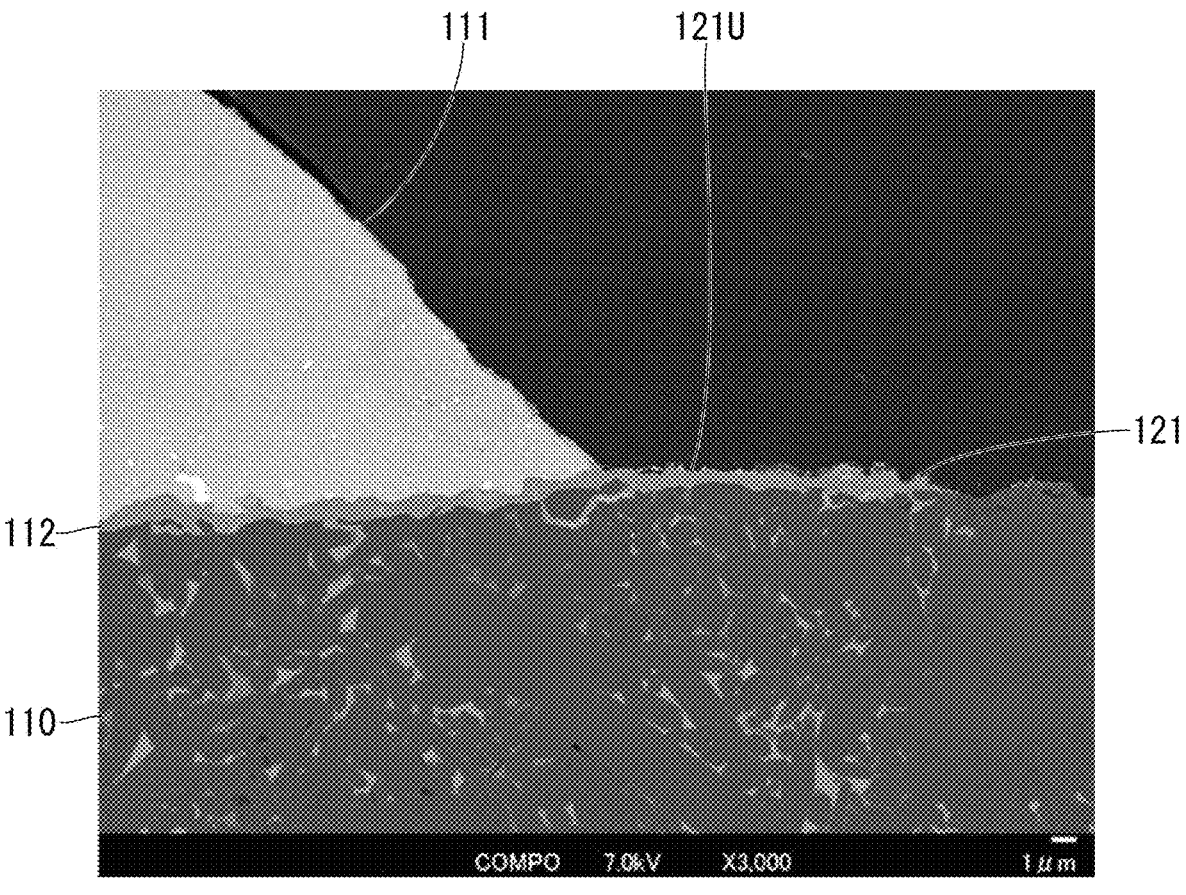

BONDED SUBSTRATE

CROSS-REFERENCE TO RELATED APPLICATION

This application is a continuation application of PCT/JP2019/010545, filed on Mar. 14, 2019, the entire contents of which are incorporated herein by reference.

BACKGROUND OF THE INVENTION

Field of the Invention

The present invention relates to a bonded substrate.

Description of the Background Art

Silicon nitride ceramics have high thermal conductivity and high insulating properties. Thus, a bonded substrate in which a copper plate is bonded to a silicon nitride ceramic substrate through a bonding layer is favorably used as an insulating heat-dissipating substrate on which a power semiconductor device is mounted.

In many cases, such a bonded substrate is manufactured by preparing an intermediate product in which a brazing material layer is interposed between a copper plate and a silicon nitride ceramic substrate, changing the brazing material layer into a bonding layer through thermal treatment on the prepared intermediate product, and patterning the copper plate and the bonding layer.

To prevent a defect of the bonded substrate which is caused by concentration of stress to end portions of the copper plate, forming, in the bonding layer, a protruding portion protruding from between the silicon nitride ceramic substrate and the copper plate is proposed.

For example, in a ceramic circuit board described in Japanese Patent No. 6158144, a copper circuit plate is bonded through a brazing material layer to at least one surface of a ceramic substrate made of silicon nitride (paragraphs 0013 and 0020). The ceramic circuit board includes the brazing material layer interposed between the copper circuit plate and the ceramic substrate, and a brazing material protruding portion that protrudes outward at the side surface of the copper circuit plate (paragraph 0013). The brazing material layer is made of a brazing material containing Ag, Cu, and Ti (paragraph 0013). The brazing material protruding portion does not have a high flatness, and includes holes that expose the ceramic substrate (FIG. 7).

Conventional bonded substrates each including a protruding portion of a bonding layer as represented by the ceramic circuit board described in Japanese Patent No. 6158144 sometimes do not exhibit favorable electrical insulating properties between adjacent copper plates. For example, the electrical insulating properties between the adjacent copper plates sometimes deteriorate when a DC electric field or an AC electric field of several kV/mm is applied in an environment at 85° C. and 85% RH.

SUMMARY

The present invention relates to a bonded substrate and, in particular, to a bonding layer thereof.

According to the present invention, a bonded substrate includes a silicon nitride ceramic substrate, a copper plate, and a bonding layer. The copper plate and the bonding layer are disposed on the silicon nitride ceramic substrate. The bonding layer bonds the copper plate to the silicon nitride ceramic substrate. The bonding layer includes: an interplate portion between the silicon nitride ceramic substrate and the copper plate; and a protruding portion protruding from between the silicon nitride ceramic substrate and the copper plate. The bonding layer covers the silicon nitride ceramic substrate to prevent exposure of the silicon nitride ceramic substrate at a position where protruding portion is disposed.

According to the present invention, the protruding portion relaxes the concentration of stress to end portions of the copper plate. This can prevent a defect of the bonded substrate which is caused by the concentration of the stress to the end portions of the copper plate.

Furthermore, a chemical residue causing a decrease in the electrical insulating properties less likely remains on the protruding portion according to the present invention. This can improve the electrical insulating properties of the bonded substrate.

It is therefore an object of the invention to provide a bonded substrate that can improve electrical insulating properties between adjacent copper plates while preventing a defect of the bonded substrate which is caused by concentration of stress to end portions of the copper plates.

The object, features, aspects, and advantages of the present invention will become more apparent from the following detailed description and the accompanying drawings.

BRIEF DESCRIPTION OF THE DRAWINGS

FIG. 1 is a cross-sectional view schematically illustrating a bonded substrate.

FIG. 2 is an enlarged cross-sectional view schematically illustrating a portion of the bonded substrate.

FIG. 3 is a flowchart illustrating a procedure for manufacturing the bonded substrate.

FIG. 4 is a cross-sectional view schematically illustrating an intermediate product obtained during manufacturing of the bonded substrate.

FIG. 5 is a cross-sectional view schematically illustrating an intermediate product obtained during manufacturing of the bonded substrate.

FIG. 7 is a flowchart illustrating a procedure for patterning copper plates and bonding layers in manufacturing the bonded substrate.

FIG. 8 is a cross-sectional view schematically illustrating an intermediate product obtained during pattering of the copper plates and the bonding layers in manufacturing the bonded substrate.

FIG. 9 is a cross-sectional view schematically illustrating an intermediate product obtained during pattering of the copper plates and the bonding layers in manufacturing the bonded substrate.

FIG. 10 illustrates a scanning electron microscope (SEM) image of a cross section of an intermediate product obtained during manufacturing of a bonded substrate in Example 1.

FIG. 11 illustrates an SEM image of a cross section of the bonded substrate manufactured in Example 1.

DESCRIPTION OF THE PREFERRED EMBODIMENTS

Figure 6:
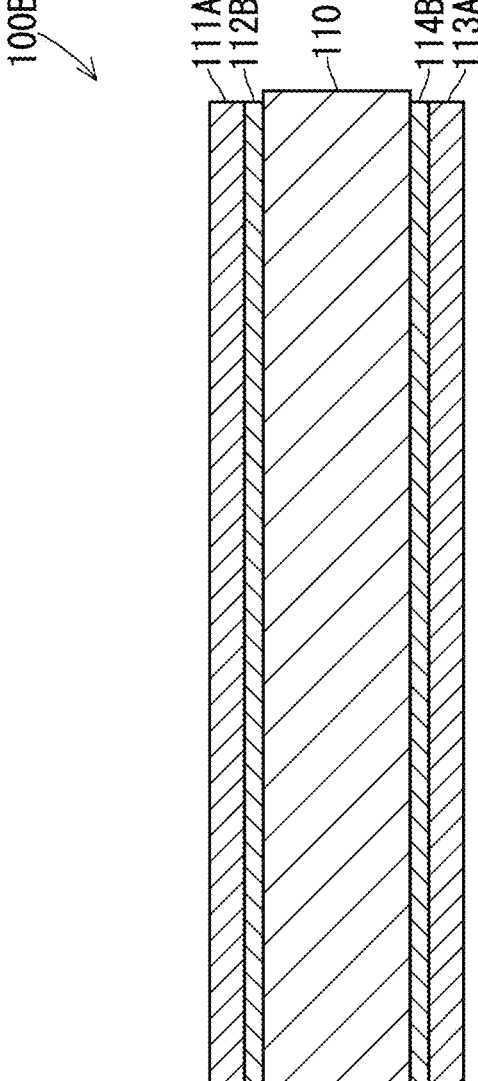
FIG. 6 is a cross-sectional view schematically illustrating an intermediate product obtained during manufacturing of the bonded substrate.

1 Cause of Decrease in Electrical Insulating Properties

The protruding portion included in each of the conventional bonded substrates as represented by the ceramic circuit board described in Japanese Patent No. 6158144 contains silver and copper. Furthermore, silver and copper contained in the protruding portion are susceptible to removal during manufacturing of the bonded substrate, particularly, during etching while the bonded substrate is being manufactured. Thus, the protruding portion does not have a high flatness. When the protruding portion does not have a high flatness, a chemical residue causing a decrease in the electrical insulating properties likely remains on the protruding portion. This is a significant cause of the decrease in the electrical insulating properties in the conventional bonded substrates. A chemical solution causing the chemical residue is, for example, a chemical solution to be used for etching a copper plate and a bonding layer, or a chemical solution to be used for cleaning the surface of the copper plate through acid cleaning. The chemical residue is made of, for example, hydrochloric acid or sulfuric acid contained in the chemical solution. When the chemical residue remains on the protruding portion, silver or copper contained in the protruding portion or an alloy including the silver and the copper contained in the protruding portion sometimes causes ion migration. This problem obviously emerges, particularly, when a DC electric field or an AC electric field of several kV/mm is applied between adjacent protruding portions in a hot-humid environment, for example, at 85° C. and 85% RH.

2 Bonded Substrate

Figure 1:
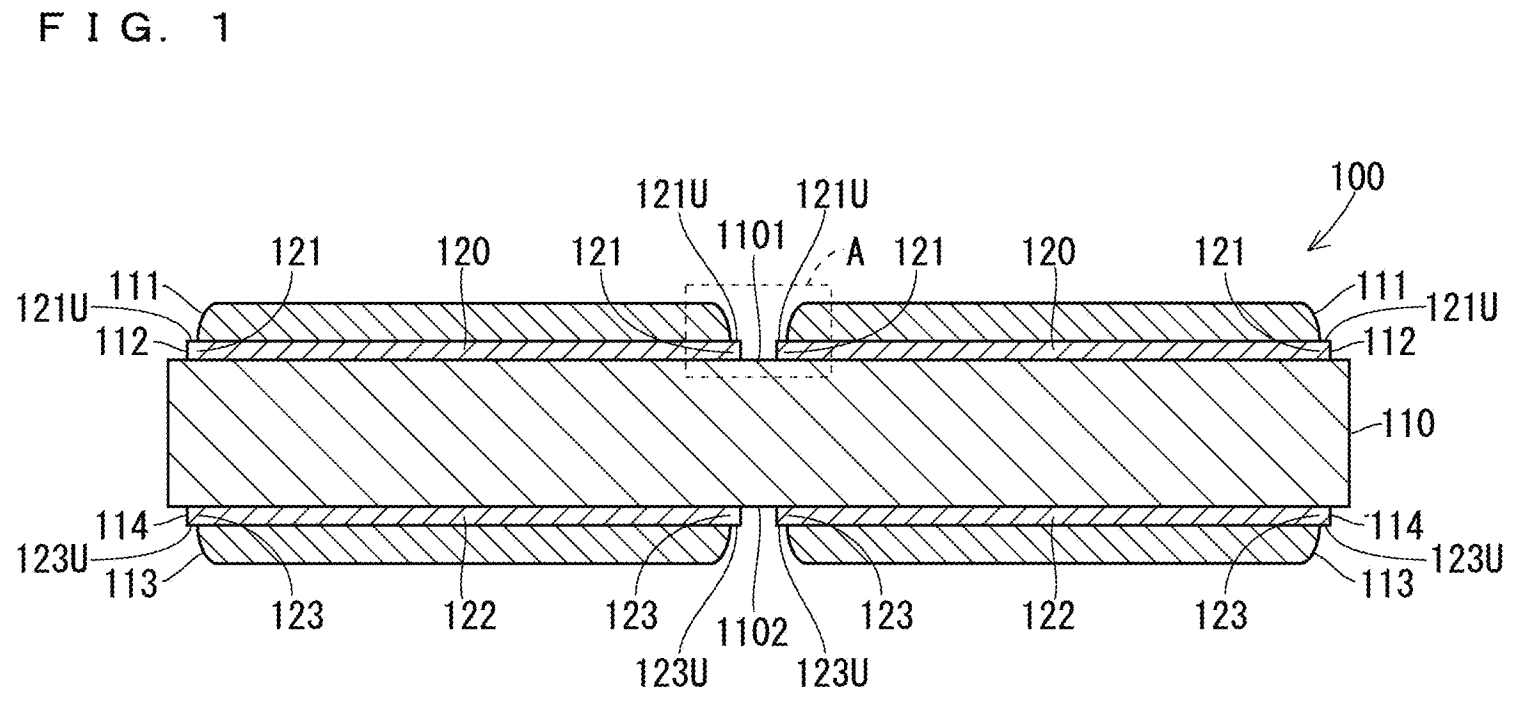

FIG. 1 is a cross-sectional view schematically illustrating a bonded substrate 100 according to this embodiment. FIG. 2 is an enlarged cross-sectional view schematically illustrating a portion of the bonded substrate 100. FIG. 2 is an enlarged view of a portion A of FIG. 1.

As illustrated in FIGS. 1 and 2, a bonded substrate 100 includes a silicon nitride ceramic substrate 110, a copper plate 111, a bonding layer 112, a copper plate 113, and a bonding layer 114. The bonded substrate 100 may include elements other than these. One of a pair of the copper plate 111 and the bonding layer 112 and a pair of the copper plate 113 and the bonding layer 114 may be omitted.

The copper plates 111 and 113 are bonded to the silicon nitride ceramic substrate 110 through the bonding layers 112 and 114, respectively. The copper plates 111 and 113 are brazed in an active metal brazing method to principal surfaces 1101 and 1102 of the silicon nitride ceramic substrate 110 through the bonding layers 112 and 114, respectively.

Applications of the bonded substrate 100 may be any. The bonded substrate 100 is used as, for example, an insulating heat-dissipating substrate on which a power semiconductor device is mounted.

3 Relaxation of Concentration of Stress to End Portions of Copper Plates

As illustrated in FIGS. 1 and 2, the copper plate 111 and the bonding layer 112 are placed on the principal surface 1101 of the silicon nitride ceramic substrate 110. As illustrated in FIG. 1, the copper plate 113 and the bonding layer 114 are placed on the principal surface 1102 of the silicon nitride ceramic substrate 110.

The bonding layers 112 and 114 bond the copper plates 111 and 113 to the principal surfaces 1101 and 1102 of the silicon nitride ceramic substrate 110, respectively.

The bonding layer 112 includes an interplate portion 120 and a protruding portion 121. The interplate portion 120 is interposed between the silicon nitride ceramic substrate 110 and the copper plate 111. The protruding portion 121 protrudes from between the silicon nitride ceramic substrate 110 and the copper plate 111. The bonding layer 114 includes an interplate portion 122 and a protruding portion 123. The interplate portion 122 is interposed between the silicon nitride ceramic substrate 110 and the copper plate 113. The protruding portion 123 protrudes from between the silicon nitride ceramic substrate 110 and the copper plate 113. In the bonded substrate 100, the protruding portions 121 and 123 relax the concentration of stress to end portions of the copper plates 111 and 113, respectively. These can prevent a defect of the bonded substrate 100 which is caused by the concentration of the stress to the end portions of the copper plates 111 and 113.

Each of the bonding layers 112 and 114 has a thickness preferably greater than or equal to 0.1 μm and less than or equal to 3 μm. The bonding layers 112 and 114 are so thin that the concentration of the stress to the end portions of the copper plates 111 and 113 are effectively relaxed.

4 Flatness of Protruding Portions

The protruding portions 121 and 123 cover the principal surfaces 1101 and 1102 of the silicon nitride ceramic substrate 110, respectively. Exposure of the principal surfaces 1101 and 1102 of the silicon nitride ceramic substrate 110 is prevented at a position where the protruding portions 121 and 123 is disposed, unlike the brazing material protruding portion included in the ceramic circuit board described in Japanese Patent No. 6158144. Specifically, the protruding portions 121 and 123 do not include holes exposing the silicon nitride ceramic substrate 110.

Each of an upper surface 121U of the protruding portion 121 and an upper surface 123U of the protruding portion 123 preferably has arithmetic average roughness Ra less than or equal to 0.7 μm, and the maximum height Rz less than or equal to 5 μm.

The protruding portions 121 and 123 have such a high flatness. Thus, chemical residues causing a decrease in the electrical insulating properties less likely remain on the protruding portions 121 and 123. This can improve the electrical insulating properties of the bonded substrate 100.

The bonding layers 112 and 114 contain a compound of at least one element selected from a group (first group) consisting of titanium (Ti) and zirconium (Zr) and at least one element selected from a group (second group) consisting of nitrogen (N) and silicon (Si), and do not contain silver (Ag) and copper (Cu) generally included in bonding layers. Thus, the protruding portions 121 and 123 also contain the compound of at least one element selected from the first group and at least one element selected from the second group, and do not contain silver (Ag) and copper (Cu) generally included in bonding layers. This is because the bonding layers 112B and 114B which are formed during manufacturing of the bonded substrate 100 do not contain silver and copper, as will be described later. Since the bonding layers 112B and 114B do not contain silver and copper, a decrease in the flatness of the finally-formed bonding layers 112 and 114 is prevented.

5 Method for Manufacturing Bonded Substrate

FIG. 3 is a flowchart illustrating a procedure for manufacturing the bonded substrate according to Embodiment 1. FIGS. 4 to 6 are cross-sectional views schematically illustrating an intermediate product obtained during manufacturing of the bonded substrate according to Embodiment 1.

Processes S101 to S104 in FIG. 3 are sequentially performed in manufacturing the bonded substrate according to Embodiment 1.

In the process S101, brazing material layers 132 and 134 are formed on the principal surfaces 1101 and 1102 of the silicon nitride ceramic substrate 110, respectively, as illustrated in FIG. 4. In the case that the copper plate 111 and the bonding layer 112 are omitted from the bonded substrate 100, forming of the brazing material layer 132 is also omitted. In the case that the copper plate 113 and the bonding layer 114 are omitted from the bonded substrate 100, forming of the brazing material layer 134 is also omitted.

At the formation of the brazing material layers 132 and 134, a paste containing an active metal braze and a solvent is prepared. The paste may further contain a binder, a dispersant, and an antifoaming agent. Next, the prepared paste is screen-printed on the principal surfaces 1101 and 1102 of the silicon nitride ceramic substrate 110 to form first and second screen printed films on the principal surfaces 1101 and 1102 of the silicon nitride ceramic substrate 110, respectively. Then, the solvent contained in the formed first and second screen printed films is vaporized. Consequently, the first and second screen printed films are changed into the brazing material layers 132 and 134, respectively. The brazing material layers 132 and 134 contain the active metal braze. The brazing material layers 132 and 134 may be formed in a method different from this.

The active metal braze contains silver (Ag) powder, and at least one metal hydride powder selected from a group consisting of titanium hydride ($TiH_2$) powder and zirconium hydride ($ZrH_2$) powder.

The active metal braze contains silver powder preferably higher than or equal to 40 wt % and lower than or equal to 80 wt %. In this case, diffusion of silver constituting the silver powder into copper plates 111A and 113A not to make bonding layers 112B and 114B contain silver in a process S103 to be described later are facilitated.

The active metal braze consists of powder whose average particle diameter is preferably larger than or equal to 0.1 μm and smaller than or equal to 10 μm. The average particle diameter can be obtained by measuring the particle size distribution using a commercially available laser diffraction particle size distribution analyzer, and calculating D50 from the measured particle size distribution. The brazing material layers 132 and 134 can be thinner because the active metal braze consists of the powder with such a small average particle diameter.

Each of the brazing material layers 132 and 134 has a thickness preferably greater than or equal to 0.1 μm and less than or equal to 5 μm. Due to such a slight thickness of the brazing material layers 132 and 134, the silver powder contained in the brazing material layers 132 and 134 are less, so that diffusion of silver constituting the silver powder into the copper plates 111A and 113A not to make the bonding layers 112B and 114B contain silver in the process S103 to be described later are facilitated.

In the process S102, the copper plates 111A and 113A are disposed on the formed brazing material layers 132 and 134, respectively, as illustrated in FIG. 5. Accordingly, an intermediate product 100A including the silicon nitride ceramic substrate 110, the copper plate 111A, the brazing material layer 132, the copper plate 113A, and the brazing material layer 134 is obtained. When the copper plate 111 and the bonding layer 112 are omitted from the bonded substrate

100, disposing of the copper plate 111A is also omitted. When the copper plate 113 and the bonding layer 114 are omitted from the bonded substrate 100, disposing of the copper plate 113A is also omitted.

In the process S103, the obtained intermediate product 100A is thermally treated. Through this treatment, the brazing material layers 132 and 134 are changed into the bonding layers 112B and 114B, respectively, as illustrated in FIG. 6. Consequently, an intermediate product 100B including the silicon nitride ceramic substrate 110, the copper plate 111A, and the bonding layer 112B, the copper plate 113A, and the bonding layer 114B is obtained. The bonding layers 112B and 114B bond the copper plates 111A and 113A, respectively, to the silicon nitride ceramic substrate 110. While the brazing material layers 132 and 134 are changed into the bonding layers 112B and 114B, respectively, silver constituting the silver powder contained in the brazing material layers 132 and 134 are diffused into the copper plates 111A and 113A, and the bonding layers 112B and 114B thus obtained do not contain silver. Accordingly, the bonding layers 112B and 114B of the intermediate product 100B obtained through the thermal treatment contain the compound of at least one element selected from the first group and at least one element selected from the second group, and do not contain silver. The at least one element selected from the second group is supplied from the silicon nitride ceramic substrate 110.

In the process S103, hot pressing is performed to the intermediate product 100A. In the hot pressing, the intermediate product 100A is preferably pressed in a thickness direction of the silicon nitride ceramic substrate 110 in a vacuum or in an inert gas according to a surface pressure profile in which the highest surface pressure is greater than or equal to 5 MPa and less than or equal to 25 MPa, and is heated according to a temperature profile in which the highest temperature is greater than or equal to 800° C. and less than or equal to 900° C. With this condition, even in the case where each of the brazing material layers 132 and 134 has a thin thickness greater than or equal to 0.1 μm and less than or equal to 5 μm, the brazing material layers 132 and 134 can bond the copper plates 111A and 113A, respectively, to the silicon nitride ceramic substrate 110 without forming voids. Furthermore, in the case that silver contained in the brazing material layers 132 and 134 is lowered by thinning the brazing material layers 132 and 134 to the extent that voids are not formed therein as above, diffusion of the silver into the copper plates 111A and 113A through the thermal treatment not to make the bonding layers 112B and 114B contain silver are facilitated. Changing the shape of particles contained in the active metal braze into a layered shape and diffusing, for example, silver into the copper plates 111A and 113A substantially make the bonding layers 112B and 114B uniform in thickness which is greater than or equal to 0.1 μm and less than or equal to 3 μm.

In the process S104, the copper plate 111A, the bonding layer 112B, the copper plate 113A, and the bonding layer 114B are patterned. Consequently, the copper plates 111A and 113A are changed into the patterned copper plates 111 and 113, respectively, as illustrated in FIG. 1. Furthermore, the bonding layers 112B and 114B are changed into the patterned bonding layers 112 and 114, respectively, as illustrated in FIG. 1.

6 Patterning of Copper Plates and Bonding Layers

FIG. 7 is a flowchart illustrating a procedure for patterning copper plates and bonding layers in manufacturing the bonded substrate 100. FIGS. 8 and 9 are cross-sectional views each schematically illustrating an intermediate product obtained during pattering of the copper plates and the bonding layers in manufacturing the bonded substrate 100.

Processes S111 to S113 in FIG. 7 are sequentially performed as pattering the copper plate 111A, the bonding layer 112B, the copper plate 113A, and the bonding layer 114B in manufacturing the bonded substrate 100.

In the process S111, the copper plates 111A and 113A are etched. Thereby, parts of the copper plates 111A and 113A are removed, so that the copper plates 111A and 113A are changed into etched copper plates 111C and 113C, respectively, as illustrated in FIG. 8. Concurrently, a first portion 140 positioning between the silicon nitride ceramic substrate 110 and the etched copper plate 111C, and a second portion 141 positioning except between the silicon nitride ceramic substrate 110 and the etched copper plate 111C are formed in the bonding layer 112B. A first portion 142 positioning between the silicon nitride ceramic substrate 110 and the etched copper plate 113C, and a second portion 143 positioning except between the silicon nitride ceramic substrate 110 and the etched copper plate 113C are formed in the bonding layer 114B. Etching solutions such as aqueous iron chloride solutions and aqueous copper chloride solutions can be used for etching the copper plates 111C and 113C.

In the process S112, the second portions 141 and 143 of the bonding layers 112B and 114B are etched. Thereby, the second portions 141 and 143 are removed, and the first portions 140 and 142 remain, as illustrated in FIG. 9. The remaining first portions 140 and 142 correspond to bonding layers 112 and 114 of the bonded substrate 100 as illustrated in FIG. 1, respectively. The second portions 141 and 143 can be etched using etching solutions such as ammonium fluoride solutions.

In the process S113, the etched copper plates 111C and 113C are further soft etched. This removes the end portions of the etched copper plates 111C and 113C. With this, the etched copper plate 111C and 113C are changed into patterned copper plates 111 and 113, respectively, as illustrated in FIG. 1. Accordingly, the interplate portions 120 and 122 illustrated in FIG. 1 and the protruding portions 121 and 123 illustrated in FIG. 1 are formed in the etched bonding layers 112 and 114 (in the first portions 140 and 142), respectively. Etching solutions such as aqueous iron chloride solutions and aqueous copper chloride solutions can be used for soft etching the etched copper plates 111C and 113C.

As described above, the bonding layers 112B and 114B do not contain silver and copper that are susceptible to removal by the etching solutions. If the bonding layers 112B and 114B contain silver and copper before etching, such silver and copper are removed through etching, and accordingly this removal causes a decrease in the flatness of the protruding portions 121 and 123. However, since the bonding layers 112B and 114B before etching do not contain silver and copper in this embodiment, the decrease in the flatness of the protruding portions 121 and 123 due to removal of silver or copper hardly occurs in the processes S111 to S113.

7 Examples

In Examples 1 to 3, the bonded substrates 100 were manufactured according to the aforementioned manufacturing method. In Comparative Example 1, the bonded substrate 100 was manufactured according to a manufacturing method similar to the manufacturing method for Examples 1 to 3 except for using an active metal braze containing larger amounts of silver and copper, using the brazing material layers 132 and 134 that is 15 μm thick, and pressing the intermediate product 100A in the thickness direction of the silicon nitride ceramic substrate 110 according to a surface pressure profile in which the highest surface pressure is 0.2 MPa. In Examples 1 to 3 and Comparative Example 1, a width of the space between the adjacent protruding portions 121 was 1 mm.

In Example 1, the cross section of the intermediate product 100B obtained during manufacturing of the bonded substrate 100 was observed with a scanning electron microscope (SEM). FIG. 10 illustrates an SEM image obtained through the observation. It can be understood from the SEM image that the bonding layer 112B has a uniform thickness.

Furthermore, the cross section of the bonded substrate 100 manufactured in Example 1 was observed with the SEM. FIG. 11 illustrates an SEM image obtained through the observation. It can be understood from the SEM image that the upper surface 121U of the protruding portion 121 is relatively flat.

The surface roughness of the upper surface 121U of the protruding portion 121 and the principal surface 1101 of the silicon nitride ceramic substrate 110 of each of the manufactured bonded substrates 100 was evaluated. For evaluating the surface roughness, the surface profiles of the upper surface 121U and the principal surface 1101 were measured using a surface roughness measuring instrument SURFCOM 480A manufactured by TOKYO SEIMITSU CO., LTD to yield arithmetic average roughness Ra and the maximum height Rz of each of the upper surface 121U and the principal surface 1101. The result is shown in Table 1.

Furthermore, the electrical insulating properties of the manufactured bonded substrates 100 were evaluated. For evaluating the electrical insulating properties, a test of applying a voltage of 1 kV between the adjacent copper plates 111 for 1,000 hours in an environment at 85° C. and 85% RH was conducted on the manufactured bonded substrates 100 to verify whether the electrical insulating properties after the test are inferior to those before the test. The result is shown in Table 1.

TABLE 1

| | Principal surface of silicon nitride ceramic substrate | | Principal surface of protruding portion | | Evaluation of insulation |
| --- | --- | --- | --- | --- | --- |
| | Ra (μm) | Rz (μm) | Ra (μm) | Rz (μm) | resistance |
| Example 1 | 0.32 | 1.84 | 0.34 | 2.15 | No deterioration |
| Example 2 | 0.32 | 1.84 | 0.38 | 2.26 | No deterioration |
| Example 3 | 0.32 | 1.84 | 0.33 | 2.09 | No deterioration |
| Comparative Example 1 | 0.32 | 1.84 | 3.2 | 15.1 | Deterioration |

As seen from Table 1, the surface roughness of the upper surface 121U of the protruding portion 121 of each of the bonded substrates 100 in Examples 1 to 3 is significantly less than that in Comparative Example 1. Furthermore, in each of Examples 1 to 3, the surface roughness of the upper surface 121U is closer to the surface roughness of the principal surface 1101 of the silicon nitride ceramic substrate 110 of the bonded substrate 100. This means that the flatness of the principal surface 1101 of the silicon nitride ceramic substrate 110 is reflected on the flatness of the upper surface 121U of the protruding portion 121 almost as it is because the protruding portion 121 has the uniform thickness. While the electrical insulating properties after the test are inferior to those before the test in the bonded substrate 100 of Comparative Example 1, the electrical insulating properties after the test are not inferior to those before the test in the bonded substrates 100 of Examples 1 to 3. It can be understood that the electrical insulating properties between the adjacent copper plates 111 in the bonded substrates 100 of Examples 1 to 3 are improved.

While the present invention is described in detail above, the foregoing description is in all aspects illustrative and does not restrict the invention. It is understood that numerous modifications that have not yet been described can be devised without departing from the scope of the invention.

What is claimed is:

1. A bonded substrate, comprising:
a silicon nitride ceramic substrate;
a copper plate disposed on the silicon nitride ceramic substrate; and
a bonding layer having a thickness greater than or equal to 0.1 μm and less than or equal to 3 μm disposed on the silicon nitride ceramic substrate, bonding the copper plate to the silicon nitride ceramic substrate,
the bonding layer including:

an interplate portion between the silicon nitride ceramic substrate and the copper plate; and
a protruding portion protruding from between the silicon nitride ceramic substrate and the copper plate,
wherein
the bonding layer covers the silicon nitride ceramic substrate to prevent exposure of the silicon nitride ceramic substrate at a position where the protruding portion is disposed,
an upper surface of the bonding layer has an arithmetic average roughness Ra less than or equal to 0.7 μm, and a maximum height Rz less than 5 μm, and
the protruding portion contains at least one of titanium and zirconium, does not contain silver, and does not contain copper.

2. The bonded substrate according to claim 1,
wherein the protruding portion includes no hole exposing the silicon nitride ceramic substrate.

* * * * *